United States Patent
Tang

(10) Patent No.: US 8,219,082 B2
(45) Date of Patent: Jul. 10, 2012

(54) ROAMING COMMUNICATION METHOD, APPARATUS, AND SYSTEM

(75) Inventor: Hong Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/177,321

(22) Filed: Jul. 6, 2011

(65) Prior Publication Data

US 2011/0263249 A1    Oct. 27, 2011

Related U.S. Application Data

(63) Continuation of application No. PCT/CN2009/075557, filed on Dec. 14, 2009.

(30) Foreign Application Priority Data

Jan. 6, 2009    (CN) .......................... 2009 1 0076517

(51) Int. Cl.
    *H04W 8/10*    (2009.01)
(52) U.S. Cl. ...................... 455/432.3; 455/433; 455/461
(58) Field of Classification Search .................. 455/432, 455/433, 434, 435, 436–445
    See application file for complete search history.

(56) References Cited

U.S. PATENT DOCUMENTS

| | | | |
|---|---|---|---|
| 7,062,270 B1 | 6/2006 | Dalvie et al. | |
| 2005/0192035 A1* | 9/2005 | Jiang | 455/461 |
| 2006/0068778 A1* | 3/2006 | Della-Torre | 455/432.1 |

FOREIGN PATENT DOCUMENTS

| | | |
|---|---|---|
| CN | 1468025 A | 1/2004 |
| CN | 1518372 A | 8/2004 |
| CN | 101193434 A | 6/2008 |
| WO | 00/74422 A1 | 12/2000 |
| WO | WO 2006/030443 A1 | 3/2006 |
| WO | WO 2007/010404 A2 | 1/2007 |

OTHER PUBLICATIONS

Extended European Search Report issued in corresponding European Patent Application No. 09837350.9, mailed Oct. 6, 2011.
Written Opinion of the International Searching Authority issued in corresponding PCT Patent Application No. PCT/CN2009/075557, mailed Mar. 25, 2010.
International Search Report issued in corresponding PCT Application No. PCT/CN2009/075557; mailed Mar. 25, 2010.

* cited by examiner

*Primary Examiner* — Kamran Afshar
*Assistant Examiner* — Kashif Siddiqui
(74) *Attorney, Agent, or Firm* — Brinks Hofer Gilson & Lione

(57) ABSTRACT

A roaming communication method in the field of communication technologies includes: obtaining a location update reject message sent by a Home Location Register (HLR) of a subscriber to a Visitor Location Register (VLR) of the subscriber; obtaining subscriber data from account information of the subscriber, where the subscriber data includes a local number and subscription information of the subscriber; and simulating the HLR to send the subscriber data to the VLR of the subscriber so that the subscriber can communicate in the visited network. The embodiments of the present invention also provide a roaming communication apparatus and system. The present invention enables a roaming subscriber to enjoy the communication service in a roaming network where no roaming agreement is signed without changing a Subscriber Identification Module (SIM). The solution is easy and convenient and saves expenses of the subscriber. At the same time, this attracts subscribers without roaming authority to use the network of an operator, thereby increasing the revenue of the operator.

15 Claims, 6 Drawing Sheets

ROAMING COMMUNICATION METHOD, APPARATUS, AND SYSTEM

CROSS-REFERENCE TO RELATED APPLICATIONS

This application is a continuation of International Application No. PCT/CN2009/075557, filed on Dec. 14, 2009, which claims priority to Chinese Patent Application No. 200910076517.8, filed on Jan. 6, 2009, both of which are hereby incorporated by reference in their entireties.

FIELD OF THE INVENTION

The present invention relates to the field of communication technologies, and in particular, to a roaming communication method, apparatus, and system.

BACKGROUND OF THE INVENTION

With the rapid development of the global economy, communication between people in the world is more and more frequent, the number of roaming mobile subscribers is increasing, and the number of international roaming subscribers is also increasing rapidly.

Although more and more operators are providing international roaming services, operators of some countries that subscribers roam to (hereinafter referred to as roaming network operators) have not signed roaming agreements with operators of many other countries yet because of various reasons. In addition, even if a roaming network operator and a home network operator have signed a roaming agreement, because of the limitations of the network and technology and the operation policy, certain subscribers are not allowed to roam internationally. For example, China Mobile and Spain Vodafone have signed a roaming agreement so that GoTone subscribers of China Mobile can roam to the network of Spain Vodafone, but M-Zone and Easyown subscribers of China Mobile cannot roam to Spain.

For subscribers without a roaming agreement, to get the communication service when roaming, they need to obtain a local number in the roaming network. The current method is to change a Subscriber Identification Module (SIM) card (to replace an old SIM card of the original network with a new SIM card of the roaming network).

During the implementation of the present invention, the inventor finds at least the following weaknesses in the preceding roaming communication method for a subscriber without a roaming agreement:

1. The subscriber needs to buy a SIM card of the roaming network, which brings additional expenses.

2. Information, such as telephone numbers, in the old SIM card needs to be entered to the new SIM card, which is inconvenient for the subscriber.

SUMMARY OF THE INVENTION

Embodiments of the present invention provide a roaming communication method, apparatus and system, which enable a subscriber to enjoy the communication service in a roaming network where no roaming agreement is signed, without the need to change a SIM card.

The embodiments of the present invention provide the following technical solution:

An embodiment of the present invention provides a roaming communication method, including:

obtaining a location update reject message sent by a Home Location Register (HLR) of a subscriber to a Visitor Location Register (VLR) of the subscriber;

obtaining subscriber data from account information of the subscriber, where the subscriber data includes a local number and subscription information of the subscriber; and simulating the HLR to send the subscriber data to the VLR of the subscriber so that the subscriber can communicate in the visited network.

An embodiment of the present invention provides a service system, including:

an obtaining unit, configured to obtain a location update reject message sent by an HLR of a subscriber to a VLR of the subscriber; and a message processing unit, configured to obtain subscriber data from account information of the subscriber and simulate the HLR to send the subscriber data to the VLR of the subscriber, so that the subscriber can communicate in the visited network, where the subscriber data includes a local number and subscription information of the subscriber.

An embodiment of the present invention provides an intercepting apparatus, including:

a receiving unit, configured to receive a location update response message sent by an HLR of a subscriber to a VLR of the subscriber; and an intercepting unit, configured to intercept the location update response message and route the message to a service system so that the service system can send subscriber data of the subscriber, who has subscribed to the roaming communication service, to the VLR, when the location update response message is a location update reject message.

An embodiment of the present invention provides a roaming communication system, including an intercepting apparatus and a service system, where:

the intercepting apparatus is configured to intercept a location update response message sent by an HLR of a subscriber to a VLR of the subscriber, and route the message to the service system; and the service system is configured to obtain subscriber data from account information of the subscriber and simulate the HLR to send the subscriber data to the VLR of the subscriber when the location update response message is a location update reject message, where the subscriber data includes a local number and subscription information of the subscriber, so that the subscriber can communicate in the visited network.

It can be seen from the technical solution provided in the embodiments of the present invention that, the present invention enables a roaming subscriber to enjoy the communication service in a roaming network where no roaming agreement is signed without changing a SIM card. The solution is easy and convenient and saves expenses of the subscriber. At the same time, the solution attracts subscribers without roaming authority to use the network of an operator, thereby increasing the revenue of the operator.

DETAILED DESCRIPTION OF THE INVENTION

Figure 1:
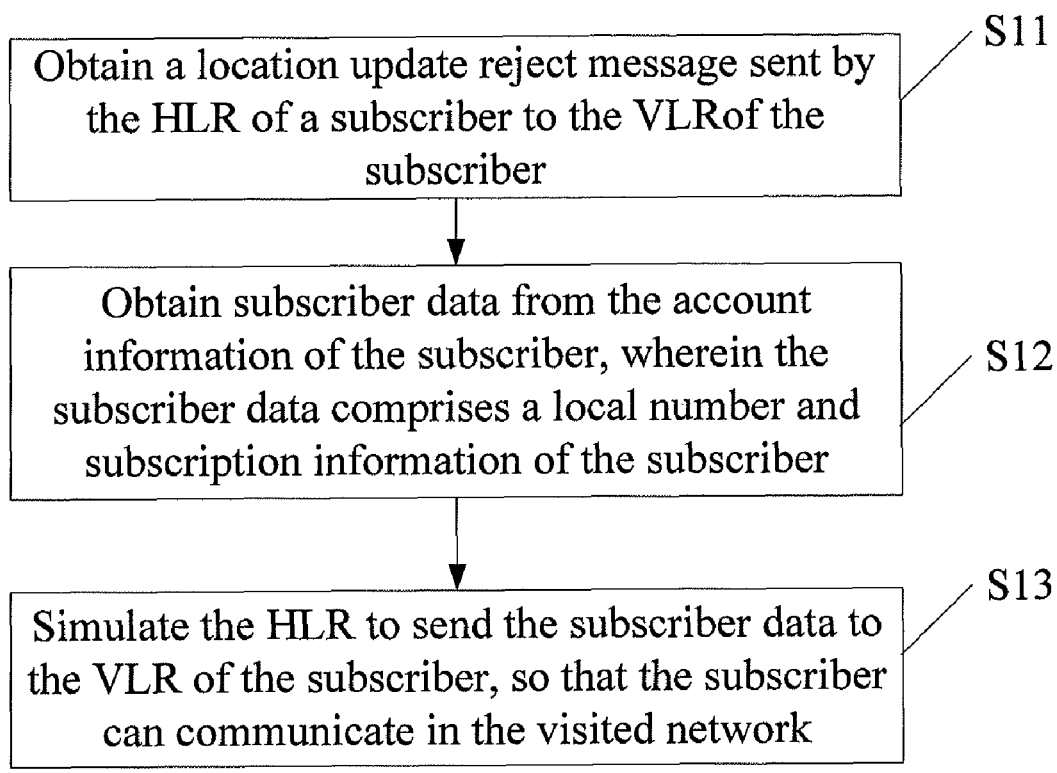
FIG. 1 is a flowchart of a roaming communication method according to an embodiment of the present invention.

The technical solution of the present invention is hereinafter described in detail with reference to the accompanying drawings. Apparently, the embodiments are only part of rather than all embodiments of the present invention. Other embodiments that those of ordinary skill in the art derive from the embodiments of the present invention also fall within the protection scope of the present invention.

The roaming referred to in the embodiments of the present invention means a subscriber roams to a country or region where no roaming agreement is signed.

When a roaming subscriber selects a network, the subscriber is first authenticated. The authentication is performed by judging whether the authentication response provided by the MS of the subscriber and the authentication triplet provided by an Authentication Center (AC) are consistent. The triplet, generated by the AC, includes RAND, SERS and Kc, where RAND is generated by a random number generator; SRES is calculated by applying a security algorithm A3 according to RAND and an authentication key Ki; and Kc is calculated by applying a security algorithm A8 according to RAND and Ki. The SIM card of the MS stores an International Mobile Subscriber Identity (IMSI), an authentication key Ki, a security algorithm A3, and a security algorithm A8. The information may not be altered. The security algorithm A3 and security algorithm A8 used by the AC to generate the triplet are the same as the security algorithms stored in the SIM card of the MS, so that the authentication of the MS are not affected by roaming. Authentication prevents illegal subscribers from using (for example, in the way of fabricating a SIM card by using a stolen IMSI and Ki) services provided by a network.

When the authentication is successful, update the location of the MS. When a subscriber is roaming, subscriber authentication and location update are separate. Subscriber authentication is completed in the AC while location update is completed in an HLR. In the location update process, after the HLR receives a VLR Number sent by a VLR that has not signed a roaming agreement, the HLR sends a location update reject message. As a result, the network selection of the subscriber fails and the subsequent call cannot continue.

A method according to an embodiment of the present invention intercepts the location update reject message, which is sent by the HLR to the VLR, and simulates the HLR to send the subscriber data related to the local number requested by the subscriber to the VLR. The subscriber data includes a Mobile Station International ISDN Number (MSISDN) and Originating CAMEL Subscription Information (O-CSI). In this way, the roaming subscriber is able to select a network successfully and the HLR triggers a called service of the roaming subscriber to the service system, so that the roaming subscriber can perform the call service and other services normally. In addition, a prepaid charging solution can be used to deduct charges of the roaming subscriber in real time and thereby, avoid the issue of settlement with the home network operator of the subscriber.

FIG. 1 is a flowchart of a roaming communication method according to an embodiment of the present invention. The method includes the following steps:

S11. Obtain a location update reject message sent by the HLR of a subscriber to the VLR of the subscriber.

Specifically, when the location update reject message passes through a Gateway Mobile Switching Center (GMSC) or an International Signalling Transfer Point (ISTP) of the roaming network, the GMSC or the ISTP intercepts the location update reject message and routes it to the service system so that the service system obtains the location update reject message.

The GMSC or the ISTP may route all location update response messages passing through the GMSC or the ISTP to the service system. The service system screens out location update reject messages from the location update response messages and sends location update response messages that are not location update reject messages to the VLR. Alternatively, the GMSC or the ISTP may judge all location update response messages passing through the GMSC or the ISTP, and intercept only location update reject messages and route the location update reject messages to the service system.

Before the GMSC or the ISTP intercepts the location update reject message, the GMSC or the ISTP may be set to route all received location update response messages or only location update reject messages to the service system.

S12. Obtain subscriber data from the account information of the subscriber, where the subscriber data includes a local number and subscription information of the subscriber.

Before the subscriber communicates in the visited network, the subscriber requests the roaming service in a business center according to the IMSI of the subscriber's SIM card; a Business Support System (BSS) or an Operation Support System (OSS) handles the request and allocates a local number from a resource pool to the IMSI. This local number is an MSISDN. Then, the BSS or the OSS synchronizes the account information about roaming communication service subscription of the subscriber to the service system. The service system stores the account information of the subscriber, where the account information including the subscription information of the subscriber, IMSI and MSISDN allocated to the subscriber according to the IMSI. The BSS or the OSS also sends a Terminated-CAMEL Subscription Information (T-CSI) request to the HLR of the subscriber, requesting the HLR to trigger a called service of the subscriber to the service system.

After the service system receives the location update reject message routed by the GMSC or the ISTP, the service system judges whether the corresponding subscriber has subscribed to the roaming communication service. If the subscriber has subscribed to the roaming communication service, the service system obtains subscriber data including the local number and subscription information from the account information of the subscriber; if the subscriber has not subscribed to the roaming communication service, the service system sends the location update reject message to the VLR.

Specifically, the service system may intercept the location update message sent by the VLR to the HLR through the GMSC or the ISTP. The service system records related information in the location update message, where the related information may include parameters like the ID and IMSI in the location update message, and then sends the location update message to the HLR. After the service system receives the location update reject message, the service system may find the related information in the corresponding location update message according to the ID in the location update reject message and find the corresponding subscriber according to the related information, and thereby, judge whether the subscriber has subscribed to the roaming communication service.

S13. Simulate the HLR to send the subscriber data to the VLR of the subscriber, so that the subscriber can communicate in the visited network.

The service system may send the subscriber data to the VLR by simulating the HLR to send to the VLR an Insert Subscriber Data (ISD) message in the case of a Global System for Mobile communications (GSM) network or a REGNOT message in the case of a Code Division Multiple Access (CDMA) network.

In the roaming communication method provided in the embodiment of the present invention, the service system simulates the HLR to send an ISD message so that the subscriber can enjoy the roaming communication service without changing a SIM card. The method is easy and convenient and saves expenses of the subscriber. At the same time, this method attracts subscribers without roaming authority to use the network of an operator, thereby increasing the revenue of the operator.

Figure 2:
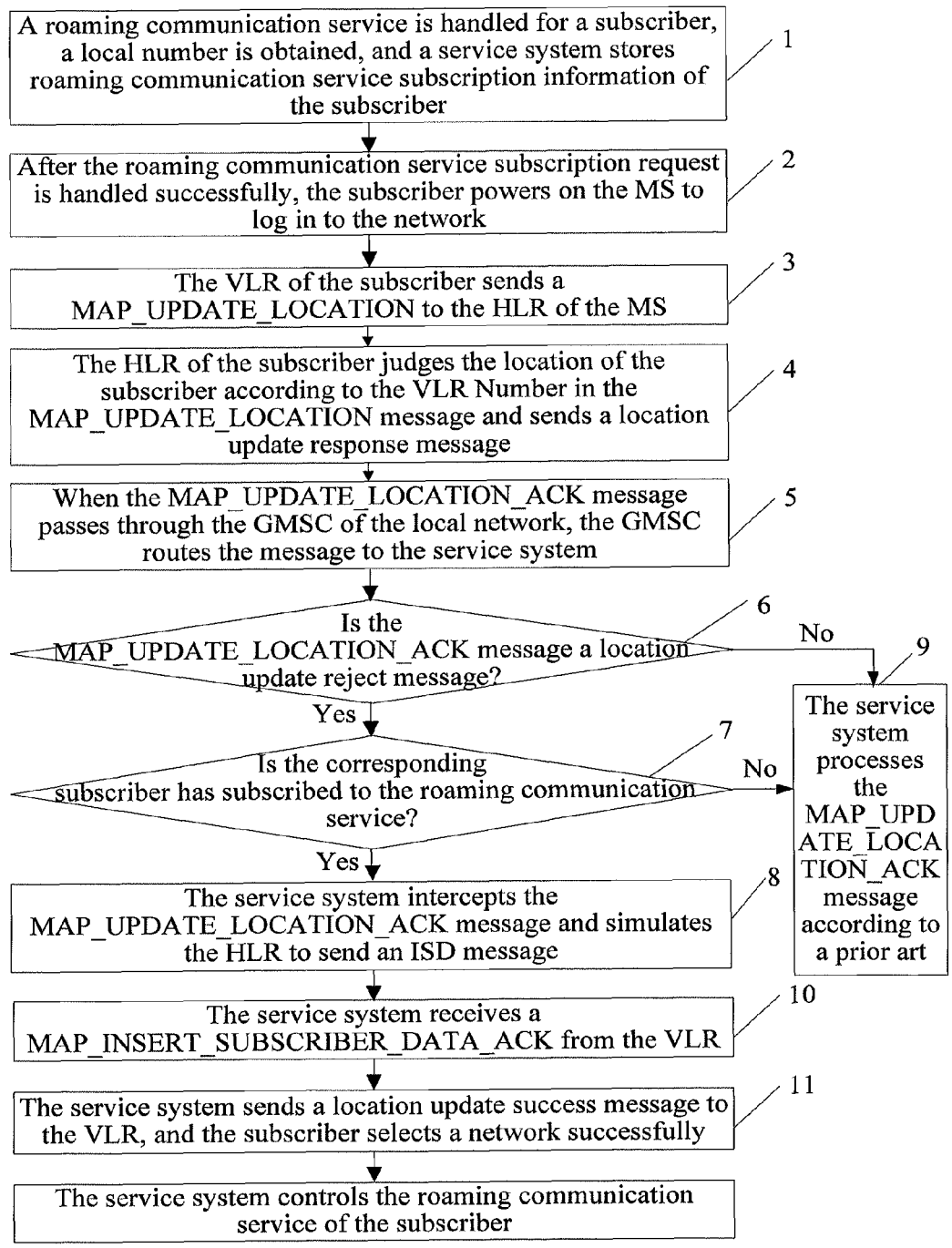
FIG. 2 is an exemplary flowchart of the roaming communication method according to an embodiment of the present invention.

The following explains the method in the embodiment of the present invention with specific applications. An embodiment of the present invention provides a roaming communication method. As shown in FIG. 2, a procedure of the method includes the following steps:

Step 1: A roaming communication service is handled for a subscriber, a local number is obtained, and a service system stores roaming communication service subscription information of the subscriber.

Figure 3:
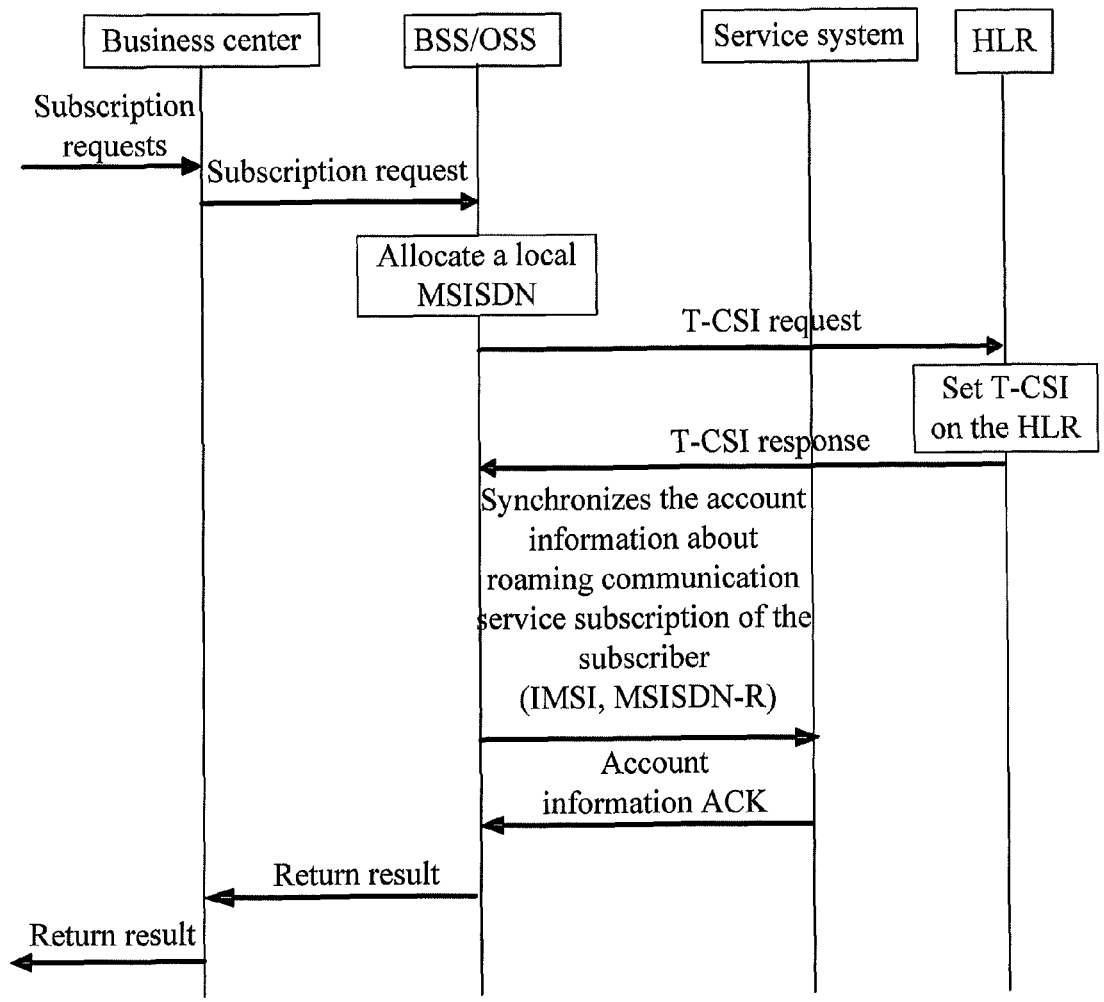
FIG. 3 is a flowchart of handling a roaming communication service subscription request for a Mobile Station (MS) according to an embodiment of the present invention.

A roaming communication service subscription procedure is as shown in FIG. 3. The subscriber requests the service in a business center according to the IMSI of the subscriber's SIM card. The BSS or the OSS handles the request and allocates a local number, namely, an MSISDN, from the resource pool to the IMSI. Then, the BSS or the OSS sends a T-CSI request to the HLR of the subscriber, requesting the HLR to trigger a called service of the subscriber to the service system. After receiving the T-CSI response from the HLR, the BSS or the OSS synchronizes the account information about roaming communication service subscription of the subscriber, including the IMSI, subscription information, and MSISDN, to the service system, and after receiving a synchronization confirmation from the service system, the BSS or the OSS sends the allocated MSISDN to the subscriber.

This step is performed before the subscriber uses the roaming communication service for the first time and will not be repeated after the roaming communication service subscription request is handled successfully.

Step 2: After the roaming communication service subscription request is handled successfully, the subscriber powers on the MS to log in to the network.

Step 3: The VLR of the subscriber sends a MAP_UP-DATE_LOCATION (IMSI) to the HLR of the MS.

The MAP_UPDATE_LOCATION message includes the IMSI, Mobile Switching Center (MSC) address, VLR Number, and invoke ID.

The MAP_UPDATE_LOCATION message is routed by the GMSC to the service system. The service system records related information in the message and sends the MAP_UP-DATE_LOCATION message to the corresponding HLR.

Before this operation can be performed, the GMSC needs to be set to route all received MAP_UPDATE_LOCATION messages to the service system, or set to record related information in the MAP_UPDATE_LOCATION message and then route the message to the service system.

Step 4: The HLR of the subscriber judges the location of the subscriber according to the VLR Number in the MAP_UPDATE_LOCATION message and sends a location update response message.

If the VLR Number belongs to an operator of a roaming-prohibited country, the HLR sends a MAP_UPDATE_LO-CATION_ACK (User Error="roaming not allow") to the VLR to reject the location update of the subscriber.

Step 5: When the MAP_UPDATE_LOCATION_ACK message passes through the GMSC of the roaming network, the GMSC routes the message to the service system.

Before this step can be performed, the GMSC needs to be set to route all MAP_UPDATE_LOCATION_ACK messages to the service system for processing.

Step 6: After receiving the MAP_UPDATE_LOCATION_ACK message, the service system judges whether the message is a location update reject message.

If the message is a location update reject message, the procedure proceeds to step 7.

Specifically, the service system can make a judgment according to the result field carried by the MAP_UPDATE_LOCATION_ACK message. A location update success message is MAP_UPDATE_LOCATION_ACK (success). The service system determines that the MAP_UPDATE_LOCA-TION_ACK message is a location update success message according to the success field. A location update reject message may be MAP_UPDATE_LOCATION_ACK (User Error="roaming not allow"), and the service system determines that the MAP_UPDATE_LOCATION_ACK message is a location update reject message according to the User Error field in the message, and knows the reason of rejection according to the "roaming not allow" field.

Step 7: The service system judges whether the corresponding subscriber has subscribed to the roaming communication service.

Because the service system has recorded the related information in the MAP_UPDATE_LOCATION message sent to the HLR and the account information about roaming communication service subscription of the subscriber, the service system is able to find the related information in the MAP_UP-DATE_LOCATION message according to the invoke ID in the MAP_UPDATE_LOCATION_ACK message, and thereby knows the IMSI of the corresponding subscriber. The service system judges, according to the IMSI of the subscriber, whether the subscriber has subscribed to the roaming communication service.

If the service system determines that the subscriber has subscribed to the roaming communication service, the procedure proceeds to step 8.

Step 8: The service system intercepts the MAP_UPDATE_LOCATION_ACK message and simulates the HLR to send an ISD message. That is, the service system sends a MAP_INSERT_SUBSCRIBER_DATA message to the VLR.

The MAP_INSERT_SUBSCRIBER_DATA message includes the local number MSISDN requested by the subscriber and the subscription information (O-CSI) of the subscriber to facilitate subsequent service triggering. After that, the procedure proceeds to step 10.

If the MAP_UPDATE_LOCATION_ACK message is not a location update reject message, or if the MAP_UPDATE_

LOCATION_ACK message is a location update reject message but the subscriber receiving the MAP_UPDATE_LOCATION_ACK message has not subscribed to the roaming communication service, the procedure proceeds to step 9.

Step 9: The service system processes the MAP_UPDATE_LOCATION_ACK message according to a prior art. For example, the service system sends the message to the VLR. The present invention is not limited with respect to the specific implementation process.

Step 10: The service system receives a MAP_INSERT_SUBSCRIBER_DATA_ACK from the VLR.

Step 11: The service system sends a location update success message to the VLR, and the subscriber selects a network successfully.

In the preceding steps 1 to 11, the service system intercepts the location update reject message sent to the VLR and simulates the HLR to send an ISD message to the VLR, thus ensuring successful network selection of the roaming subscriber. After the subscriber selects the network successfully, the subscriber can enjoy the normal communication service in the roaming network, and the service system controls the roaming communication service of the subscriber. Charging and fee deduction with respect to the roaming communication service are completed by the service system. In this process, the roaming subscriber can enjoy the communication service without changing a SIM card. This is easy and convenient and saves expenses of the subscriber. At the same time, this method attracts subscribers without roaming authority to use the network of an operator, thereby increasing the revenue of the operator.

The following describes the communication procedure where the roaming subscriber is a calling party and a procedure where the roaming subscriber is a called party after the network selection of the roaming subscriber is successful.

Figure 4:
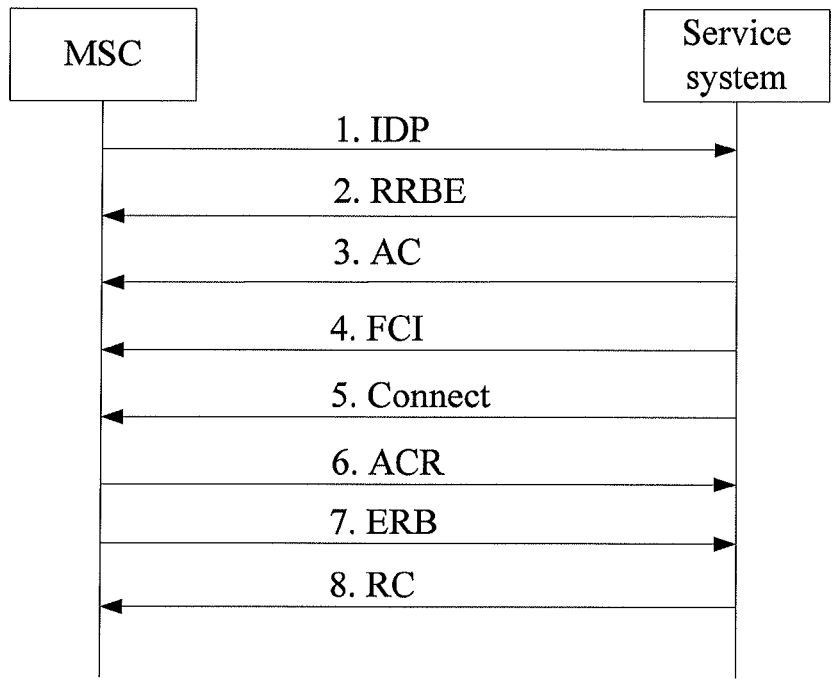
FIG. 4 is a flowchart of a call origination procedure of an MS that has subscribed to the roaming communication service according to an embodiment of the present invention.

When the roaming subscriber originates a call, the call is triggered to the service system. The service system controls the call and sends a Furnish Charging Information (FCI) message to the MSC, instructing the MSC to mark the Call Detail Record (CDR) of the subscriber, so that the charging system will not charge or perform international settlement on the CDR. The service system performs the charging and fee deduction of the subscriber. The specific procedure is as shown in FIG. 4, including the following steps:

1. The originating MSC sends an Initial Detection Point (IDP) message to the service system, and the call is triggered to the service system which will control the call.

2. The service system sends a Request Report BCSM Event (RRBE) message to the MSC, requesting the MSC to report Basic Call State Model (BCSM) events.

3. The service system sends an Apply Charging (AC) request to the MSC.

4. The service system sends Furnish Charging Information (FCI) to the MSC, instructing the MSC to mark the CDR of the subscriber.

5. The service system sends a Connect message to connect the call so that the call between the originating and terminating parties is connected.

6. The MSC sends an Apply Charging Report (ACR) to the service system, and the service system deducts the related fee.

7. The MSC sends an Event Report BCSM (ERB) to the service system.

8. The service system sends a Release Call (RC) message to the MSC and the call ends.

From the preceding call origination process, it is known that the entire communication process is controlled by the service system and that the fee deduction is also completed by the service system.

Figure 5:
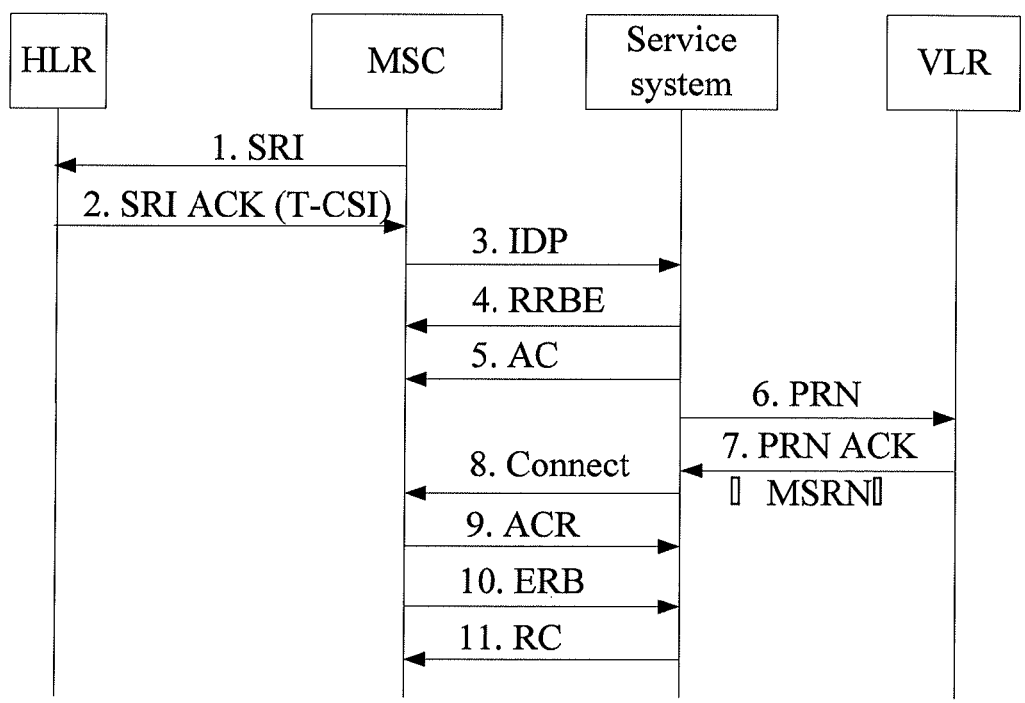
FIG. 5 is a flowchart of a call termination procedure of an MS that has subscribed to the roaming communication service according to an embodiment of the present invention.

When the roaming subscriber is called as a called party, the HLR sends T-CSI to the originating MSC. The originating MSC triggers the call to the service system according to the T-CSI and the service system controls the call and completes related charging and fee deduction. The specific procedure is as shown in FIG. 5, and includes the following steps:

1. The originating MSC sends a Send Routing Information (SRI) request to the terminating HLR.

2. The terminating HLR returns a SRI ACK which carries T-CSI to the originating MSC.

3. The MSC triggers the call to the service system according to the T-CSI, and sends an IDP message to the service system which controls the call.

4. The service system sends an RRBE message to the MSC, requesting the MSC to report BCSM events.

5. The service system sends an AC message to the MSC.

6. The service system sends a Provide Roaming Number (PRN) request to the VLR of the subscriber, requesting a roaming number.

7. The VLR allocates a Mobile Station Roaming Number (MSRN) and sends the MSRN to the service system via a PRN ACK.

8. The service system sends a Connect message to connect the called MSRN and adds a prefix before the calling number to help the terminating MSC sort CDRs according to the calling prefix in the CDRs. The call between the originating and terminating parties is connected.

9. The MSC sends an ACR message to the service system and the service system deducts the related fee.

10. The MSC sends an ERB message to the service system.

11. The service system sends an RC to the MSC. The call ends.

The charging system sorts CDRs according to the calling prefix in the case of call termination of the roaming subscriber. Alternatively, the charging system may directly pick out CDRs with local numbers but foreign IMSIs without charging and international settlement processing. The charging and fee deduction on such roaming subscribers are all completed in the service system. The present invention does not limit the CDR sorting mode of the charging system.

Fund deposit of such roaming subscribers can be completed through Interactive Voice Response (IVR) or Unstructured Supplementary Service Data (USSD), or in a business center.

The roaming communication method in the embodiment of the present invention enables the roaming subscriber to enjoy the roaming communication service without the need to change a SIM card, where related charging and fee deduction are processed separately. The method is easy and convenient and saves expenses of the subscriber. At the same time, this method attracts subscribers without roaming authority to use the network of an operator, thereby increasing the revenue of the operator.

Figure 6:
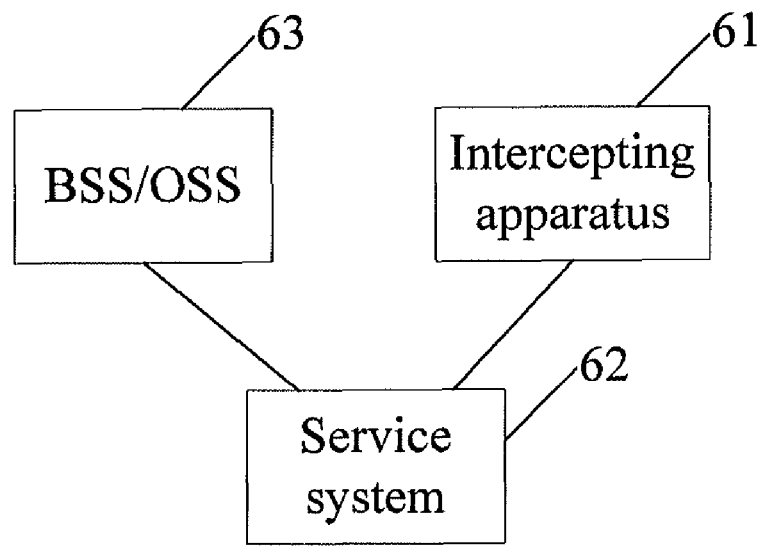
FIG. 6 is a schematic structural diagram of a roaming communication system according to an embodiment of the present invention.

An embodiment of the present invention provides a roaming communication system. A schematic structural diagram of the system is shown in FIG. 6, including an intercepting apparatus 61 and a service system 62.

Figure 7:
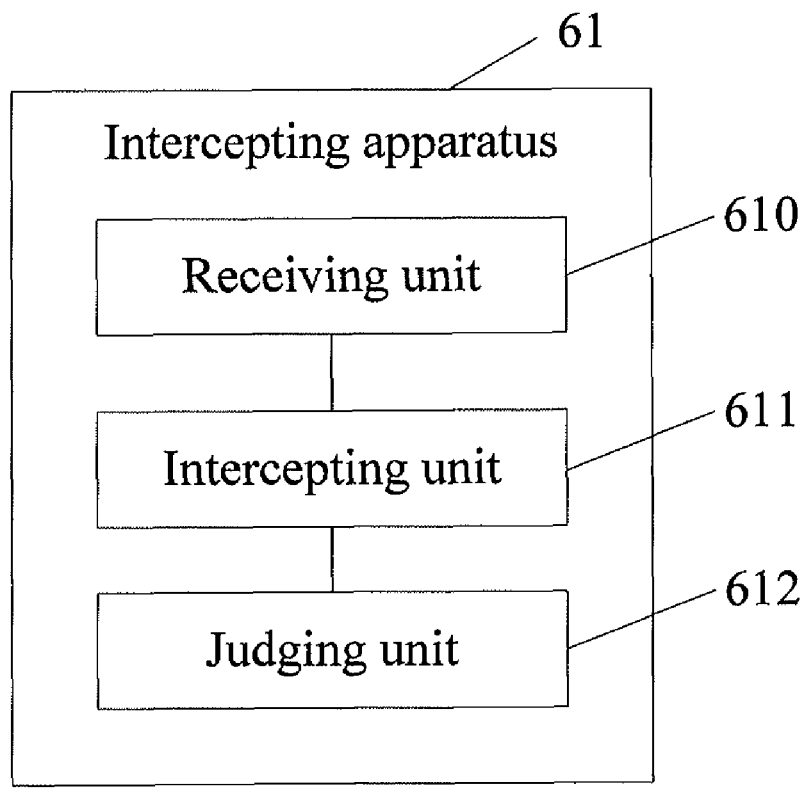
FIG. 7 is a schematic structural diagram of an intercepting apparatus according to an embodiment of the present invention.

The intercepting apparatus 61 is configured to intercept the location update response message sent by the HLR of a subscriber to the VLR of the subscriber, and route the location update response message to the service system. The intercepting apparatus may be a GMSC or an ISTP. FIG. 7 illustrates a structure of the intercepting apparatus in an embodiment of the present invention. The intercepting apparatus includes:

a receiving unit 610, configured to receive the location update response message sent by the HLR to the VLR of the subscriber; and an intercepting unit 611, configured to intercept the received location update response message and route the location update response message to the service system so that the service system can send subscriber data of the subscriber, who has subscribed to the roaming communication service, to the VLR, when the location update response message is a location update reject message.

Optionally, the intercepting apparatus 61 further includes:

a judging unit 612, configured to judge whether the location update response message is a location update reject message.

The intercepting unit 611 is configured to intercept the location update reject message and route the message to the service system 62.

The receiving unit 610 is further configured to receive a location update message sent by the VLR to the HLR; the intercepting unit 611 is further configured to route the location update message to the service system 62.

Optionally, the intercepting apparatus 61 further includes:

a recording unit (not illustrated in the Figure), configured to record related information in the location update message, including the IMSI, MSC address, VLR Number, and invoke ID.

This structure is only an exemplary embodiment of the present invention and the present invention is not limited to this structure. Any structure that enables interception of the location update response message and routing of the message to the service system is covered by the protection scope of the present invention.

The service system 62 is configured to receive the location update message and the location update response message, and when the location update response message is a location update reject message, send an ISD message and a location update success message to the current VLR of the subscriber who has subscribed to the roaming communication service, where the ISD message includes the local number and subscription information of the subscriber, so that the subscriber can communicate in the roaming network without signing a roaming agreement. The service system 62 is further configured to charge and deduct the fee for the communication. The service system 62 is further configured to obtain and record the related information from the location update message, where the related information includes the IMSI, MSC address, VLR Number, and invoke ID, so as to find the specific subscriber and account information according to the related information.

Figure 8:
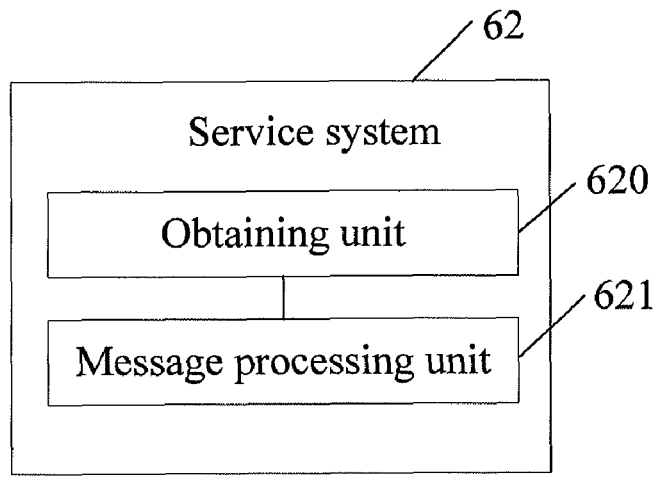
FIG. 8 is a schematic structural diagram of a service system according to an embodiment of the present invention.

To complete the functions, as shown in FIG. 8, a service system 62 according to an embodiment of the present invention includes:

an obtaining unit 620, configured to obtain the location update reject message sent by the HLR to the VLR of the subscriber; and a message processing unit 621, configured to obtain subscriber data from the account information of the subscriber and simulate the HLR to send the subscriber data to the VLR of the subscriber, so that the subscriber can communicate in the visited network, where the subscriber data includes the local number and subscription information of the subscriber.

The obtaining unit 620 is further configured to obtain the location update message sent by the VLR to the HLR and routed by the intercepting apparatus 61; and the service system 62 further includes a recording unit (not illustrated in the Figure), configured to record the related information in the location update message, including the IMSI, MSC address, VLR Number, and invoke ID.

Figure 9:
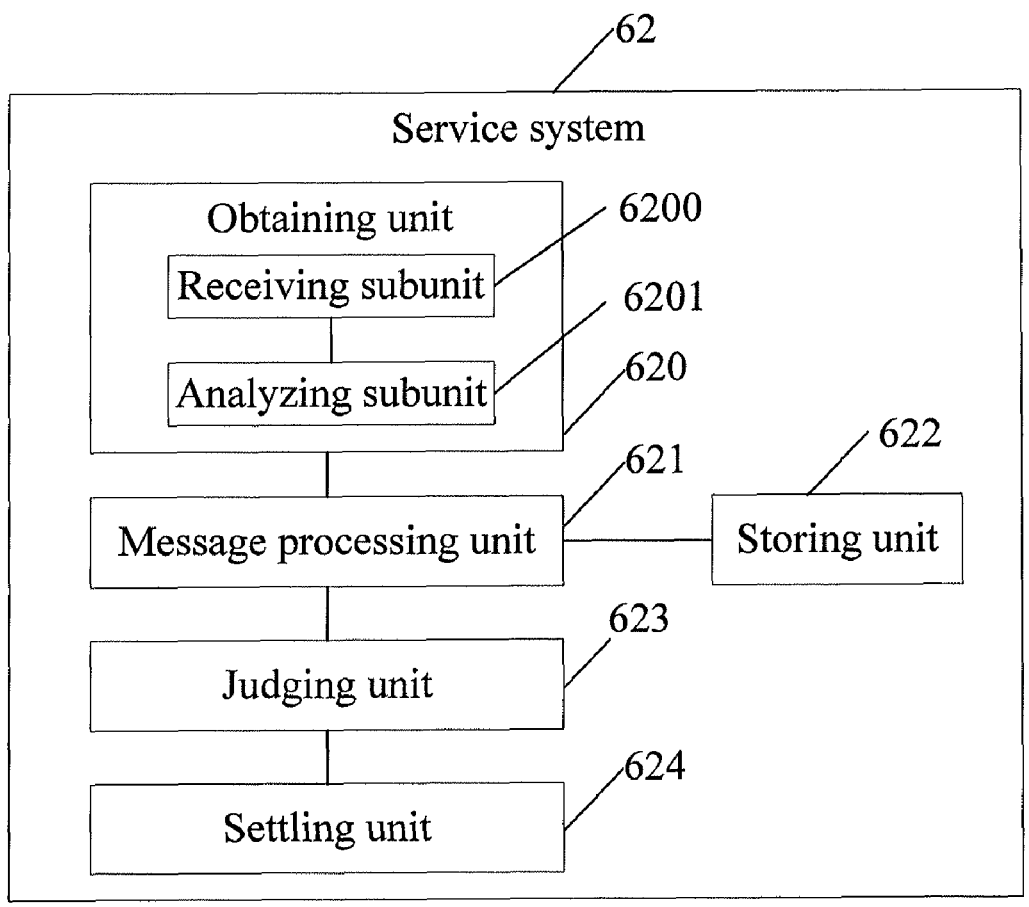
FIG. 9 is a schematic structural diagram of the service system according to another embodiment of the present invention.

As shown in FIG. 9, in an embodiment of the present invention, the obtaining unit 620 includes:

a receiving subunit 6200, configured to receive the location update response message sent by the HLR to the VLR and intercepted by the intercepting apparatus 61; and an analyzing subunit 6201, configured to screen out location update reject messages from location update response messages, and send location update response messages that are not location update reject messages to the VLR.

This structure of the obtaining unit is only an exemplary embodiment of the present invention and the present invention is not limited to this structure. Any structure that enables the obtaining of the location update reject message is covered by the protection scope of the present invention.

As shown in FIG. 9, the service system optionally includes:

a storing unit 622, configured to store the account information about roaming communication service subscription of the subscriber, where the account information includes the subscription information, IMSI, and the local number MSISDN allocated to the subscriber according to the IMSI; and/or a judging unit 623, configured to judge whether the subscriber has subscribed to the roaming communication service and notify the message processing unit of the judging result, where the judging unit 623 can find the specific subscriber according to the related information recorded by the recording unit and then judge whether the subscriber has subscribed to the roaming communication service, because the service system stores the account information of the subscriber who has subscribed to the roaming communication service; and/or a settling unit 624, configured to charge and deduct the fee for the roaming communication service controlled by the service system.

This structure of the service system 62 is only an exemplary embodiment of the present invention and the present invention is not limited to this structure. All structures that enable the preceding functions of the service system are covered by the protection scope of the present invention. The service system may be an independent device or be physically integrated with an existing communication device.

The roaming communication system may further include a BSS/OSS 63, configured to: receive and handle a roaming communication service subscription request of the subscriber, allocate a local MSISDN to the subscriber according to the IMSI of the subscriber, and synchronize the account information about roaming communication service subscription of the subscriber to the service system, where subscriber information includes the subscription information, IMSI and MSISDN of the subscriber.

The preceding internal structure of the roaming communication system is only an exemplary embodiment of the present invention and the present invention does not exclude other internal structures. All service system internal structures are covered by the scope of the present invention provided that the structures fulfill the functions of the service system.

In the foregoing embodiment of the present invention, the roaming subscriber can enjoy the communication service without changing a SIM card. This is easy and convenient and saves expenses of the subscriber. At the same time, this attracts subscribers without roaming authority to use the network of an operator, thereby increasing the revenue of the operator.

To sum up, the embodiments of the present invention enable the roaming subscriber to enjoy the communication service without changing a SIM card. This is easy and convenient and saves expenses of the subscriber. At the same time, this attracts subscribers without roaming authority to use the network of an operator, thereby increasing the revenue of the operator. The embodiments of the present invention provide a platform for the exchange of subscribers worldwide.

Those of ordinary skill in the art understand that all or part of the steps in the method provided by the foregoing embodiments of the present invention can be implemented by hardware under the instruction of a program. The program can be stored in a computer readable storage medium.

The embodiments described above are only exemplary ones of the invention, and are not meant to limit the protection scope of the invention. It is apparent that those skilled in the art can make various modifications and variations to the invention without departing from the spirit and scope of the invention. The invention is intended to cover the modifications and variations provided that they fall within the protection scope defined by the claims or their equivalents.

What is claimed is:

1. A roaming communication method, comprising:
obtaining a location update reject message sent by a Home Location Register (HLR) of a subscriber to a Visitor Location Register (VLR) of the subscriber;
obtaining subscriber data from account information of the subscriber, wherein the subscriber data comprises a local number and subscription information of the subscriber; and
simulating the HLR to send the subscriber data to the VLR of the subscriber, so that the subscriber can communicate in a visited network;
wherein obtaining the location update reject message sent by the HLR of the subscriber to the VLR of the subscriber comprises:
receiving a location update response message sent by the HLR to the VLR and intercepted by a Gateway Mobile Switching Center (GMSC) or an International Signaling Transfer Point (ISTP); and
screening out location update reject messages from location update response messages, and sending location update response messages that are not location update reject messages to the VLR.

2. A roaming communication method, comprising:
obtaining a location update reject message sent by a Home Location Register (HLR) of a subscriber to a Visitor Location Register (VLR) of the subscriber;
obtaining subscriber data from account information of the subscriber, wherein the subscriber data comprises a local number and subscription information of the subscriber; and
simulating the HLR to send the subscriber data to the VLR of the subscriber, so that the subscriber can communicate in a visited network; wherein obtaining the location update reject message sent by the HLR of the subscriber to the VLR of the subscriber comprises: receiving the location update reject message sent by the HLR to the VLR and intercepted by a GMSC or an ISTP.

3. The method according to claim 2, further comprising:
determining, according to the location update reject message, whether the corresponding subscriber has subscribed to a roaming communication service; if the subscriber has subscribed to the roaming communication service, obtaining subscriber data from the account information of the subscriber; and if the related subscriber has not subscribed to the roaming communication service, sending the location update reject message to the VLR.

4. The method according to claim 3, further comprising:
receiving a location update message sent by the VLR to the HLR and intercepted by a GMSC or an ISTP, recording related information in the location update message, and sending the location update message to the HLR;
wherein determining, according to the location update reject message, whether the corresponding subscriber has subscribed to the roaming communication service comprises: finding related information in the location update message according to an ID of the location update reject message, finding the corresponding subscriber according to the related information in the location update message, and determining whether the corresponding subscriber has subscribed to the roaming communication service.

5. The method according to claim 1, further comprising: charging and deducting a fee for the roaming communication of the subscriber.

6. The method according to claim 5, further comprising:
instructing a Mobile Switching Center (MSC) to mark a Call Detail Record (CDR) of the subscriber, or adding a prefix before a calling number when a called number is connected so that a charging system can sort CDRs according to the marked CDR or a calling prefix.

7. A service system, comprising:
an obtaining unit, configured to obtain a location update reject message sent by a Home Location Register (HLR) of a subscriber to a Visitor Location Register (VLR) of the subscriber; and
a message processing unit, configured to obtain subscriber data from account information of the subscriber and simulate the HLR to send the subscriber data to the VLR of the subscriber, so that the subscriber can communicate in a visited network, wherein the subscriber data comprises a local number and subscription information of the subscribe;
wherein the obtaining unit is further configured to obtain a location update message sent by the VLR to the HLR; and the service system further comprises:
a recording unit, configured to record related information in the location update message, wherein the related information comprises an International Mobile Subscriber Identity (IMSI), a Mobile Switching Center (MSC) address, a VLR Number, and an invoke ID.

8. A service system, comprising:
an obtaining unit, configured to obtain a location update reject message sent by a Home Location Register (HLR) of a subscriber to a Visitor Location Register (VLR) of the subscriber; and
a message processing unit, configured to obtain subscriber data from account information of the subscriber and simulate the HLR to send the subscriber data to the VLR of the subscriber, so that the subscriber can communicate in a visited network, wherein the subscriber data comprises a local number and subscription information of the subscriber;
a storing unit, configured to store the account information about roaming communication service subscription of the subscriber, wherein the account information comprises subscription information, an IMSI, and a local number Mobile Station International ISDN Number (MSISDN) allocated to the subscriber according to the IMSI.

9. The service system according to claim 8, further comprising:
a judging unit, configured to determine whether the subscriber has subscribed to a roaming communication service and notify the message processing unit of the judging result.

10. A service system, comprising:
an obtaining unit, configured to obtain a location update reject message sent by a Home Location Register (HLR) of a subscriber to a Visitor Location Register (VLR) of the subscriber; and
a message processing unit, configured to obtain subscriber data from account information of the subscriber and simulate the HLR to send the subscriber data to the VLR of the subscriber, so that the subscriber can communicate in a visited network, wherein the subscriber data comprises a local number and subscription information of the subscriber; wherein the obtaining unit comprises:
a receiving subunit, configured to receive a location update response message sent by the HLR to the VLR and intercepted by a Gateway Mobile Switching Center (GMSC) or an International Signaling Transfer Point (ISTP); and
an analyzing subunit, configured to screen out location update reject messages from location update response messages and send location update response messages that are not location update reject messages to the VLR.

11. The service system according to claim 7, further comprising:
a settling unit, configured to charge and deduct a fee for a roaming communication service controlled by the service system.

12. The method according to claim 2, further comprising: charging and deducting a fee for the roaming communication of the subscriber.

13. The method according to claim 12, further comprising:
instructing a Mobile Switching Center (MSC) to mark a Call Detail Record (CDR) of the subscriber, or adding a prefix before a calling number when a called number is connected so that a charging system can sort CDRs according to the marked CDR or a calling prefix.

14. The service system according to claim 8, further comprising:
a settling unit, configured to charge and deduct a fee for a roaming communication service controlled by the service system.

15. The service system according to claim 10, further comprising:
a settling unit, configured to charge and deduct a fee for a roaming communication service controlled by the service system.

* * * * *